(12) United States Patent
Ouyang et al.

(10) Patent No.: US 11,420,870 B2
(45) Date of Patent: Aug. 23, 2022

(54) METHOD FOR DIRECTLY SYNTHESIZING SODIUM BOROHYDRIDE BY SOLID-STATE BALL MILLING AT ROOM TEMPERATURE

(71) Applicant: SOUTH CHINA UNIVERSITY OF TECHNOLOGY, Guangzhou (CN)

(72) Inventors: Liuzhang Ouyang, Guangzhou (CN); Hao Zhong, Guangzhou (CN); Wei Chen, Guangzhou (CN); Hui Wang, Guangzhou (CN); Jiangwen Liu, Guangzhou (CN); Min Zhu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 740 days.

(21) Appl. No.: 16/332,391

(22) PCT Filed: Dec. 13, 2016

(86) PCT No.: PCT/CN2016/109616
§ 371 (c)(1),
(2) Date: Mar. 12, 2019

(87) PCT Pub. No.: WO2018/053950
PCT Pub. Date: Mar. 29, 2018

(65) Prior Publication Data
US 2021/0284531 A1  Sep. 16, 2021

(30) Foreign Application Priority Data
Sep. 20, 2016  (CN) .......................... 201610835517.1

(51) Int. Cl.
*C01B 6/21* (2006.01)
*B02C 4/00* (2006.01)

(52) U.S. Cl.
CPC .................. *C01B 6/21* (2013.01); *B02C 4/00* (2013.01); *C01P 2006/82* (2013.01)

(58) Field of Classification Search
CPC ..................................... C01B 6/21; B02C 4/00
See application file for complete search history.

(56) References Cited

U.S. PATENT DOCUMENTS

2006/0106195 A1* 5/2006 Kong ..................... B60L 50/72
                                                                    528/394
2009/0214409 A1* 8/2009 Chin ......................... C01B 6/21
                                                                    423/288
2017/0183236 A1* 6/2017 Yoshizaki ................. C01B 6/21

FOREIGN PATENT DOCUMENTS

CA          2951787        12/2015
CN          1683242        10/2005
(Continued)

OTHER PUBLICATIONS

Chinese Search Report dated Sep. 20, 2016, Application No. PCT/CN2016/109616.
(Continued)

*Primary Examiner* — Hoa (Holly) Le
(74) *Attorney, Agent, or Firm* — The Dobrusin Law Firm, PC (57) ABSTRACT

The present invention discloses a method for directly synthesizing sodium borohydride by solid-state ball milling at room temperature, which comprises: performing solid-state ball milling on a mixture of a reducing agent and a reduced material by using a ball mill under room temperature, and performing purification to obtain sodium borohydride. The reducing agent comprises one or more of magnesium, magnesium hydride, aluminum, calcium, and magnesium silicide. The reduced material is sodium metaborate containing crystallization water or sodium metaborate, or is a mixture of sodium metaborate containing crystallization water and (Continued)

sodium metaborate. The solid-state milling is performed in a mixed atmosphere of argon and hydrogen, or an argon atmosphere, or a hydrogen atmosphere. The present invention has a simple process, a controllable and adjustable reaction procedure, mild reaction conditions, low energy consumption, low costs, high yield, no pollution, good safety, and easy industrial production.

10 Claims, 5 Drawing Sheets

(56) References Cited

FOREIGN PATENT DOCUMENTS

| CN | 1778668 A | 5/2006 |
|---|---|---|
| CN | 101269793 A | 9/2008 |
| CN | 101654223 A | 2/2010 |

OTHER PUBLICATIONS

Chan-Li Hsueh—Regeneration of Spent-$NaBH_4$ back to $NaBH_4$ by Using High-Energy Ball Milling, International Journal of Hydrogen Energy 34 (2009), 1717-1725.

* cited by examiner

METHOD FOR DIRECTLY SYNTHESIZING SODIUM BOROHYDRIDE BY SOLID-STATE BALL MILLING AT ROOM TEMPERATURE

FIELD OF THE INVENTION

The present invention relates to a method for preparing sodium borohydride, in particular to a method for directly synthesizing sodium borohydride by solid-state ball milling at room temperature.

BACKGROUND OF THE INVENTION

As an important role in the development of green energy in recent decades, hydrogen has received attention from all parties in the 21st century. The use of hydrogen requires several technologies including production, storage, transportation, and use, where storage technology is a short board. In the technologies studied nowadays, the hydrolysis controllable hydrogen release technology has been used to realize the integration of hydrogen production and hydrogen storage, effectively solving the problem of hydrogen storage. The hydrolysis hydrogen production technology using sodium borohydride as a raw material is an excellent method. The sodium borohydride hydrolysis method has the following outstanding advantages: sodium borohydride has a high hydrogen storage capacity, the amount of hydrogen released during hydrolysis is large (the theoretical hydrogen release amount can reach 10.8 wt %), the hydrolysis reaction is controllable, the obtained hydrogen has high purity, and the hydrolysis by-products are non-toxic and harmless. Therefore, the sodium borohydride hydrolysis method for hydrogen production effectively solves the technical problem of hydrogen storage. However, the sodium borohydride hydrolysis reaction is irreversible, and the by-products are difficult to be re-reduced to sodium borohydride at low costs, which limit the application of the sodium borohydride hydrolysis method for hydrogen production.

In the current industrial production, the Schlesinger method and the Bayer method are mainly used to produce sodium borohydride. The Schlesinger method uses sodium hydride and trimethyl borate as raw materials. The reaction equation is as follows:

$$4NaH + B(OCH_3)_3 \rightarrow NaBH_4 + 3NaOCH_3 \quad (1)$$

The Schlesinger method has a relatively complete production line, allowing continuous mass production and guaranteeing the output. Therefore, this industrial production method has been used ever since. The Schlesinger method operates from 225° C. to 275° C., and its costs are mainly on the raw materials. According to the stoichiometric reaction, the synthesis of 1 mol of sodium borohydride requires 4 mol of sodium hydride. Sodium hydride is relatively expensive as a raw material, which makes the sodium borohydride produced by the Schlesinger method more expensive.

The Bayer method is another industrial method for the large-scale production of sodium borohydride. It uses borax, metallic sodium, hydrogen and silicon dioxide as raw materials. The reaction equation is as follows:

$$Na_2B_4O_7 + 16Na + 8H_2 + 7SiO_2 \rightarrow 4NaBH_4 + 7Na_2SiO_3 \quad (2)$$

Although the Bayer method has a mature production line and a large output, its reaction temperature is as high as 700° C., and high-pressure hydrogen is required, which result in a large risk factor and higher requirements for equipment, as well as higher costs due to the high-pressure hydrogen as an additional hydrogen source. The reducing agent used in the synthesis is metallic sodium, which is expensive and thus increases the final synthesis costs.

In summary, the current industrial production methods of sodium borohydride are costly, consume a large amount of energy, and have a large risk factor. With sodium metaborate as the hydrolysis by-product of sodium borohydride, if the above industrial production method is used as a regeneration method of the hydrolysis by-product, an additional step is required to convert the hydrolysis by-product into the above-mentioned raw materials, which further increases the costs and processes and is difficult to meet the requirements of practical applications.

According to international reports (International Journal of Hydrogen Energy, 2003, 28, 989-993; Renewable Energy, 2010, 35, 1895-1899), sodium borohydride is often synthesized at a high temperature by using magnesium hydride and anhydrous sodium metaborate. The reaction equation is as follows:

$$NaBO_2 + 2MgH_2 \rightarrow NaBH_4 + 2MgO \quad (3)$$

An important condition for such solid phase reactions is high temperature and high pressure, with the reaction temperature usually higher than 500° C. and the required hydrogen pressure as high as 70 atm, resulting in a large risk factor in the preparation process. In addition, it should be pointed out that this method requires the use of an additional hydrogen source, which is provided by magnesium hydride. Magnesium hydride needs to be synthesized by using magnesium and hydrogen under high temperature and high pressure, which increases production costs and energy consumption. Another raw material, anhydrous sodium metaborate, is not a direct hydrolysis by-product. The actual hydrolysis by-product of sodium borohydride is sodium metaborate containing crystallization water (sodium metaborate dihydrate or sodium metaborate tetrahydrate). The reaction of producing anhydrous sodium metaborate from sodium metaborate tetrahydrate has a temperature higher than 350° C., such that the preparation process has high energy consumption. The method based on the reaction (3) also includes a method of using mechanical ball milling, so as to solve the cost, energy consumption and safety issues brought by high temperature and high pressure, but there is still no way to solve the cost and energy consumption issues brought by raw materials. In view of the difficulty in the synthesis of magnesium hydride, some studies have shown that magnesium, hydrogen and anhydrous sodium metaborate are directly used to react with each other to synthesize sodium borohydride. The reaction equation is as follows:

$$NaBO_2 + 2Mg + 2H_2 \rightarrow NaBH_4 + 2MgO \quad (4)$$

The reaction condition for such gas-solid reactions is also high temperature and high pressure, with the reaction temperature higher than 500° C. and the required hydrogen pressure up to 70 atm. However, the yield is only 10%. Thus, the energy consumption is high but the yield is low. In addition, some methods directly use sodium, hydrogen and aqueous sodium metaborate to synthesize sodium borohydride at high temperature and high pressure. However, the yield is only about 10%. Still, the energy consumption is high but the yield is low. Therefore, the current method for synthesizing sodium borohydride in the laboratory is costly and energy-intensive, difficult to be practically applied to industrial production.

In summary, the existing production and regeneration methods of sodium borohydride have high requirements on the preparation conditions, not suitable for the actual hydrolysis hydrogen production; besides, these methods also require the use of an additional source of hydrogen, resulting in increased costs.

CONTENTS OF THE INVENTION

In order to overcome the above disadvantages and shortcomings of the prior art, the object of the present invention is to provide a method for directly synthesizing sodium borohydride by solid-state ball milling at room temperature, which directly uses the hydrolysis by-product to synthesize sodium borohydride, so that the preparation conditions are mild and the process is simple.

The object of the present invention is achieved by the following technical solution:

A method for directly synthesizing sodium borohydride by solid-state ball milling at room temperature, comprising: performing solid-state ball milling on a mixture of a reducing agent and a reduced material by using a ball mill under room temperature, and performing purification to obtain sodium borohydride.

The reducing agent comprises one or more of magnesium, magnesium hydride, aluminum, calcium, and magnesium silicide.

The reduced material is sodium metaborate containing crystallization water or sodium metaborate, or is a mixture of sodium metaborate containing crystallization water and sodium metaborate.

The solid-state ball milling is carried out in a non-oxidizing atmosphere.

Preferably, the molar ratio of the reducing agent to the reduced material is determined as follows:

Let the molar amount of magnesium in the reducing agent be $n_1$ ($n_1 \geq 0$), the molar amount of aluminum element be $n_2$ ($n_2 \geq 0$), and the molar amount of calcium element be $n_3$ ($n_3 \geq 0$), and let the number of oxygen in the reduced material be a, then $(n_1+1.5n_2+n_3):a=(3:4)$ to $(4:1)$.

Preferably, the non-oxidizing atmosphere is a mixed atmosphere of argon and hydrogen, or an argon atmosphere, or a hydrogen atmosphere, or vacuum.

Preferably, the pressure of the mixed atmosphere of argon and hydrogen is 0-2 MPa, the pressure of the argon atmosphere is 0-2 MPa, and the pressure of the hydrogen atmosphere is 0-2 Mpa.

Preferably, the ball mill is a high-energy oscillating ball mill.

Preferably, the ball mill has a ratio of grinding media to material of (5-50):1, a ball milling time of 1-20 h, and a rotational speed of 1000-1200 rpm.

Preferably, the purification is specifically as follows:

The milled mixture is dissolved in a solvent, and then filtered to obtain a clear filtrate, which is dried to produce purified sodium borohydride powder.

Preferably, the solvent is ethylene diamine.

Preferably, the drying is vacuum drying.

Preferably, the sodium metaborate containing crystallization water is sodium metaborate dihydrate or sodium metaborate tetrahydrate.

Compared with the prior art, the present invention has the following advantages and benefits:

(1) The present invention synthesizes sodium borohydride by directly reacting a hydrolysis by-product of sodium borohydride (sodium metaborate dihydrate, or sodium metaborate tetrahydrate, or a mixture of sodium metaborate and sodium metaborate containing crystallization water) with a reduced material (including more than one of magnesium, magnesium hydride, aluminum, calcium and magnesium silicide, or a mixture or an alloy thereof) under solid-state conditions by means of mechanical energy of a mechanical ball milling at normal temperature and normal pressure. Avoiding the high temperature and high pressure synthesis process of the Schlesinger method and the Bayer method, the mechanical ball milling method adopted by the present invention has the controllable and adjustable reaction process, simple technics, small energy consumption, large output, and no pollution. Besides, the use of the mechanical ball milling method, as an industrially mature and commonly used method, is easy to achieve mass production. The yield of sodium borohydride synthesized by the present invention can reach more than 70% of the highest standard of the similar methods, and even up to 90%, so the present invention has the technical conditions for achieving efficient mass production.

(2) The sodium metaborate containing crystallization water used in the present invention is the sole or main by-product of the conventional sodium borohydride hydrolysis method. The conventional laboratory method requires high temperature dehydration of the by-product to prepare anhydrous sodium metaborate. However, this process requires large energy consumption and high costs. The present invention completely omits the dehydration process and directly produces sodium borohydride.

(3) The raw materials used in the present invention are magnesium, magnesium hydride, aluminum, calcium or magnesium silicide, or alloys thereof, which are inexpensive and suitable for mass production.

(4) The present invention directly uses hydrogen carried by the crystallization water in the hydrolysis by-product of sodium borohydride as a hydrogen source for the synthesis of sodium borohydride. This method, relative to the conventional laboratory method, does not require the hydrogen produced by the natural gas reforming method, reducing the costs due to the use of the additional hydrogen source. In view of the direct reduction of hydrogen cations in the crystallization water in the hydrolysis by-product to portable usable hydrogen anions during the synthesis, the present invention is a method of integrating fuel regeneration with storage material regeneration. This has a positive significance for sodium borohydride as a hydrogen production and hydrogen storage material.

DETAILED DESCRIPTION OF THE EMBODIMENTS

The present invention will be further described below in detail with reference to examples, but the embodiments of the present invention are not limited thereto.

The purification process not specifically described in the examples comprised the following steps: In a glove box with an argon atmosphere, the milled mixture was dissolved in ethylene diamine, and then filtered to obtain a clear filtrate, which was dried in vacuum to produce purified sodium borohydride powder; finally, the yield was quantitatively determined by iodine titration. Characterization of the target product of the examples was carried out by a Fourier transform infrared (FT-IR) spectrometer or an X-ray diffractometer (XRD).

The ball milling in the examples was carried out at room temperature.

Example 1

Figure 1:
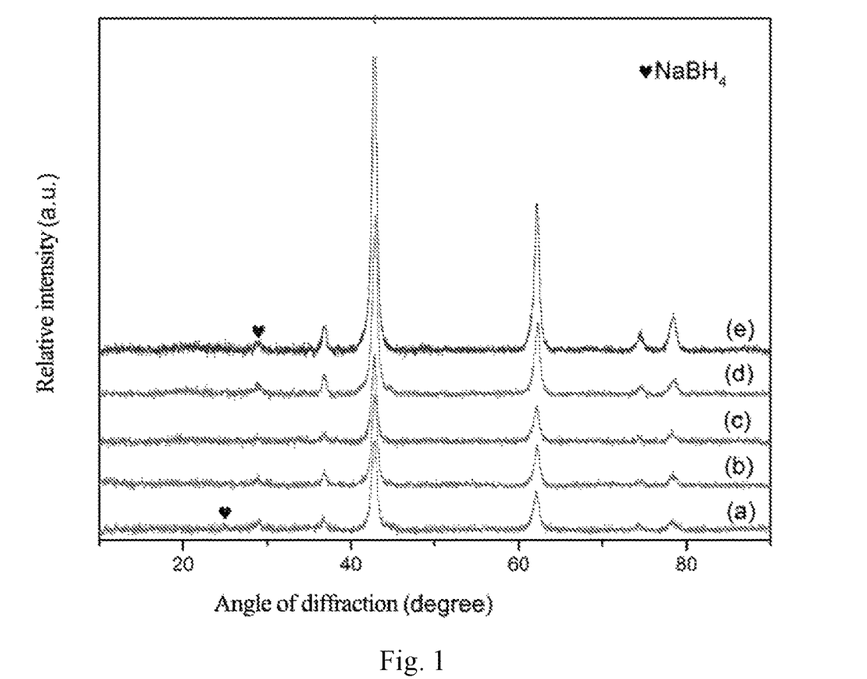
FIG. 1 shows an XRD pattern of a milled product of magnesium and sodium metaborate dihydrate according to examples of the present invention; and the examples corresponding to the respective lines in the figure are as follows: (a) Example 5; (b) Example 4; (c) Example 3; (d) Example 2; and (e) Example 1.
Figure 8:
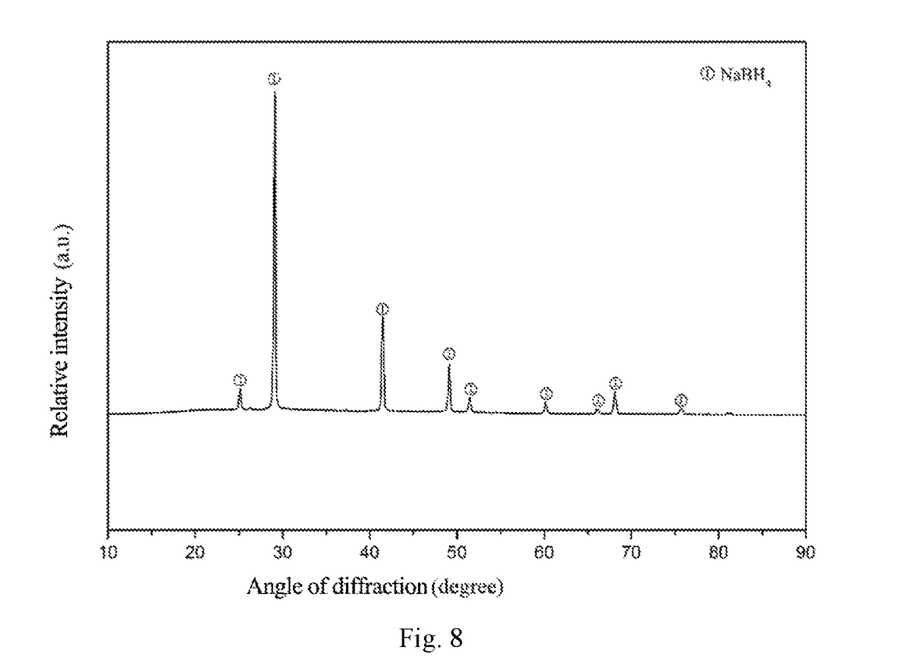
FIG. 8 shows an XRD pattern of purified sodium borohydride obtained in an example of the present invention.

In a glove box with an argon atmosphere of 0.1 MPa, magnesium and sodium metaborate dihydrate were weighed at a molar ratio of 5:1, mixed, and placed in a ball mill tank, which was then placed in a high-energy oscillating ball mill (QM-3C); and then the materials were directly milled in the argon atmosphere for 15 h at a ratio of grinding media to material of 50:1 and a rotational speed of 1200 rpm. The curve (e) in FIG. 1 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder. FIG. 8 shows an XRD pattern of the white powder. The diffraction peaks appearing at 25.1°, 28.9°, 41.4°, 49.0°, 51.3°, 60.0°, 66.0° and 68.0° belong to sodium borohydride crystals, proving that the white powder was pure sodium borohydride, with the yield quantitatively determined to be 69% by iodine titration. The price of the raw material Mg is about 12,000 yuan/ton, while in the closest prior art the price of the raw material $MgH_2$ is about 800,000 yuan/ton. With this method, even if only raw materials are considered, the costs have been reduced significantly. Based on the available literature (Journal of Power Sources, 2014, 269, 768-772), the prior art requires dehydration, while this method does not require dehydration, thereby enabling this method to save 3.4% of the energy.

Example 2

In a glove box with an argon atmosphere of 0.1 MPa, magnesium and sodium metaborate dihydrate were weighed at a molar ratio of 4.5:1, mixed, and placed in a ball mill tank, which was then placed in a high-energy oscillating ball mill (QM-3C); and then the materials were directly milled in the argon atmosphere for 15 h at a ratio of grinding media to material of 50:1 and a rotational speed of 1200 rpm. The curve (d) in FIG. 1 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 49% by iodine titration.

Example 3

In a glove box with an argon atmosphere of 0.1 MPa, magnesium and sodium metaborate dihydrate were weighed at a molar ratio of 5.5:1, mixed, and placed in a ball mill tank, which was then placed in a high-energy oscillating ball mill (QM-3C); and then the materials were directly milled in the argon atmosphere for 15 h at a ratio of grinding media to material of 30:1 and a rotational speed of 1200 rpm. The curve (c) in FIG. 1 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 68% by iodine titration.

Example 4

In a glove box with an argon atmosphere of 0.1 MPa, magnesium and sodium metaborate dihydrate were weighed at a molar ratio of 5:1, mixed, and placed in a ball mill tank, which was then placed in a high-energy oscillating ball mill (QM-3C); and then the materials were directly milled in the argon atmosphere for 15 h at a ratio of grinding media to material of 30:1 and a rotational speed of 1200 rpm. The curve (b) in FIG. 1 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 56% by iodine titration.

Example 5

In a glove box with an argon atmosphere of 0.1 MPa, magnesium and sodium metaborate dihydrate were weighed at a molar ratio of 4.5:1, mixed, and placed in a ball mill tank, which was then placed in a high-energy oscillating ball mill (QM-3C); and then the materials were directly milled in the argon atmosphere for 17.5 h at a ratio of grinding media to material of 30:1 and a rotational speed of 1200 rpm. The curve (a) in FIG. 1 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 45% by iodine titration.

Example 6

Figure 2:
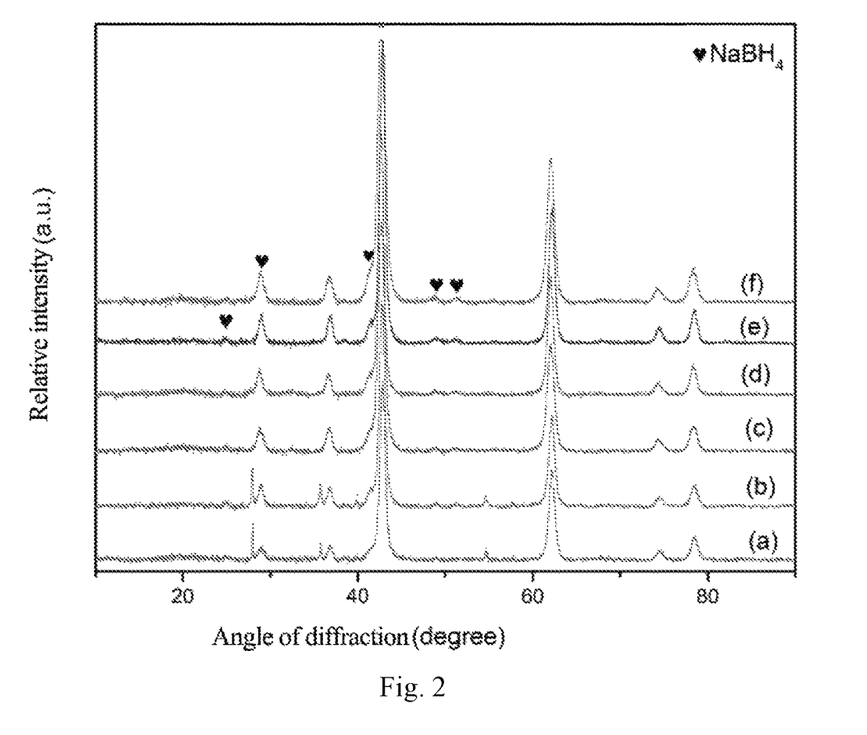
FIG. 2 shows an XRD pattern of a milled product of magnesium hydride and sodium metaborate dihydrate according to examples of the present invention; and the examples corresponding to the respective lines in the figure are as follows: (a) Example 8; (b) Example 7; (c) Example 6; (d) Example 11; (e) Example 10; and (f) Example 9.

In a glove box with an argon atmosphere of 0.1 MPa, magnesium hydride and sodium metaborate dihydrate were weighed at a molar ratio of 5.5:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. The curve (c) in FIG. 2 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 90% by iodine titration. Based on the available literature (Journal of Power Sources, 2014, 269, 768-772), the prior art requires dehydration, while this method does not require dehydration, thereby enabling this method to save 3.4% of the energy.

Example 7

In a glove box with an argon atmosphere of 0.1 MPa, magnesium hydride and sodium metaborate dihydrate were weighed at a molar ratio of 5:1, mixed, and placed in a ball mill tank, which was vacuumed and then charged with hydrogen of 2 MPa and then placed in a high-energy oscillating ball mill (QM-3C); and then the materials were milled for 10 h at a ratio of grinding media to material of 50:1 and a rotational speed of 1200 rpm. The curve (b) in FIG. 2 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 82% by iodine titration.

Example 8

In a glove box with an argon atmosphere of 0.1 MPa, magnesium hydride and sodium metaborate dihydrate were weighed at a molar ratio of 4.5:1, mixed, and placed in a ball mill tank, which was vacuumed and then charged with hydrogen of 2 MPa and then placed in a high-energy oscillating ball mill (QM-3C); and then the materials were milled for 5 h at a ratio of grinding media to material of 50:1 and a rotational speed of 1200 rpm. The curve (a) in FIG. 2 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 71% by iodine titration.

Example 9

In a glove box with an argon atmosphere of 0.1 MPa, magnesium hydride and sodium metaborate dihydrate were weighed at a molar ratio of 5.5:1, mixed, and placed in a ball mill tank, which was then placed in a high-energy oscillating ball mill (QM-3C); and then the materials were directly milled in the argon atmosphere for 15 h at a ratio of grinding media to material of 30:1 and a rotational speed of 1200 rpm. The curve (f) in FIG. 2 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 89% by iodine titration.

Example 10

In a glove box with an argon atmosphere of 0.1 MPa, magnesium hydride and sodium metaborate dihydrate were weighed at a molar ratio of 5:1, mixed, and placed in a ball mill tank, which was then placed in a high-energy oscillating ball mill (QM-3C); and then the materials were directly milled in the argon atmosphere for 15 h at a ratio of grinding media to material of 30:1 and a rotational speed of 1200 rpm. The curve (e) in FIG. 2 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 90% by iodine titration.

Example 11

In a glove box with an argon atmosphere of 0.1 MPa, magnesium hydride and sodium metaborate dihydrate were weighed at a molar ratio of 4.5:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The curve (d) in FIG. 2 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 77% by iodine titration.

Example 12

In a glove box with an argon atmosphere of 0.1 MPa, magnesium and sodium metaborate tetrahydrate were weighed at a molar ratio of 9:1, mixed, and placed in a ball mill tank, which was vacuumed and then charged with argon of 2 MPa and then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (e) in FIG. 1, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 64% by iodine titration. The price of the raw material Mg is about 12,000 yuan/ton, while in the closest prior art the price of the raw material $MgH_2$ is about 800,000 yuan/ton. With this method, even if only raw materials are considered, the costs have been reduced significantly. Based on the available literature (Journal of Power Sources, 2014, 269, 768-772), the prior art requires dehydration, while this method does not require dehydration, thereby enabling this method to save 3.4% of the energy.

Example 13

Figure 3:
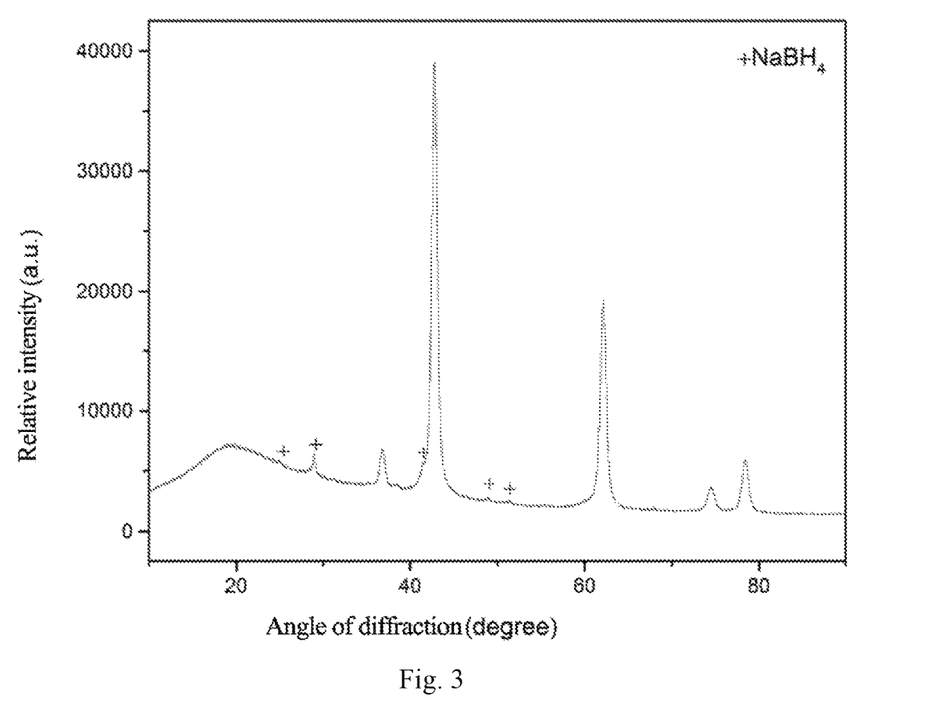
FIG. 3 shows an XRD pattern of a milled product of magnesium hydride and sodium metaborate tetrahydrate according to Example 13 of the present invention.

In a glove box with an argon atmosphere of 0.1 MPa, magnesium hydride and sodium metaborate tetrahydrate were weighed at a molar ratio of 8.25:1, mixed, and placed in a ball mill tank, which was vacuumed and then charged with hydrogen of 0.1 MPa and then placed in a high-energy oscillating ball mill (QM-3C); and then the materials were directly milled in the argon atmosphere for 20 h at a ratio of grinding media to material of 50:1 and a rotational speed of 1200 rpm. The curve in FIG. 3 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 88% by iodine titration. Based on the available literature (Journal of Power Sources, 2014, 269, 768-772), the prior art requires dehydration, while this method does not require dehydration, thereby enabling this method to save 3.4% of the energy.

Example 14

Figure 4:
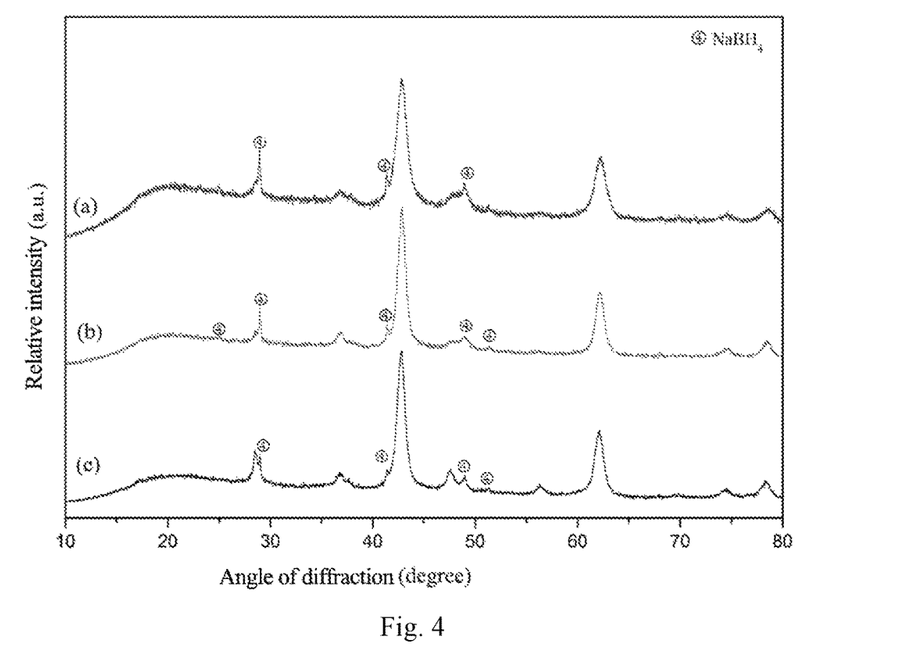
FIG. 4 shows an XRD pattern of a milled product of magnesium silicide and sodium metaborate dihydrate according to examples of the present invention; and the examples corresponding to the respective lines in the figure are as follows: (a) Example 14; (b) Example 15; and (c) Example 16.

In a glove box with an argon atmosphere of 0.1 MPa, magnesium silicide and sodium metaborate dihydrate were weighed at a molar ratio of 2:1, mixed, and placed in a ball mill tank, which was then placed in a high-energy oscillating ball mill (QM-3C); and then the materials were directly milled in the argon atmosphere for 20 h at a ratio of grinding media to material of 50:1 and a rotational speed of 1000 rpm. The curve (a) in FIG. 4 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 61% by iodine titration. The price of the raw material $Mg_2Si$ is about 11,000 yuan/ton, while in the closest prior art the price of the raw material $MgH_2$ is about 800,000 yuan/ton. With this method, even if only raw materials are considered, the costs have been reduced significantly. Based on the available literature (Journal of Power Sources, 2014, 269, 768-772), the prior art requires dehydration, while this method does not require dehydration, thereby enabling this method to save 3.4% of the energy.

Example 15

In a glove box with an argon atmosphere of 0.1 MPa, magnesium silicide and sodium metaborate dihydrate were weighed at a molar ratio of 2.5:1, mixed, and placed in a ball mill tank, which was then placed in a high-energy oscillating ball mill (QM-3C); and then the materials were directly milled in the argon atmosphere for 20 h at a ratio of grinding media to material of 50:1 and a rotational speed of 1000 rpm. The curve (b) in FIG. 4 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 70% by iodine titration.

Example 16

In a glove box with an argon atmosphere of 0.1 MPa, magnesium silicide and sodium metaborate dihydrate were weighed at a molar ratio of 3:1, mixed, and placed in a ball mill tank, which was then placed in a high-energy oscillating ball mill (QM-3C); and then the materials were directly milled in the argon atmosphere for 20 h at a ratio of grinding media to material of 50:1 and a rotational speed of 1000 rpm. The curve (c) in FIG. 4 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 78% by iodine titration.

Example 17

In a glove box with an argon atmosphere of 0.1 MPa, magnesium silicide and sodium metaborate dihydrate were weighed at a molar ratio of 1.5:1, mixed, and placed in a ball mill tank, which was then placed in a high-energy oscillating ball mill (QM-3C); and then the materials were directly milled in the argon atmosphere for 1 h at a ratio of grinding media to material of 50:1 and a rotational speed of 1000 rpm. The mixture was dissolved in ethylene diamine, and then filtered to obtain a clear filtrate, which was dried in vacuum to produce white powder, with the yield quantitatively determined to be 12% by iodine titration.

Example 18

Figure 5:
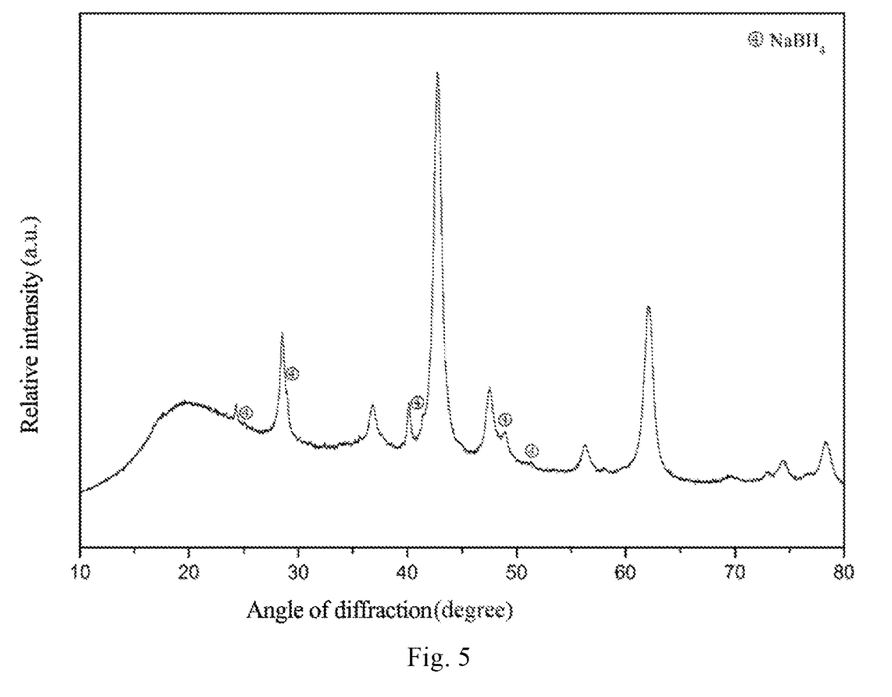
FIG. 5 shows an XRD pattern of a milled product of magnesium silicide and sodium metaborate tetrahydrate according to Example 18 of the present invention.

In a glove box with an argon atmosphere of 0.1 MPa, magnesium silicide and sodium metaborate tetrahydrate were weighed at a molar ratio of 4.5:1, mixed, and placed in a ball mill tank, which was vacuumed and then charged with a mixed atmosphere (composed of argon and hydrogen) of 0.1 MPa and then placed in a high-energy oscillating ball mill (QM-3C); and then the materials were directly milled in the argon atmosphere for 20 h at a ratio of grinding media to material of 50:1 and a rotational speed of 1000 rpm. The curve in FIG. 5 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 69% by iodine titration. The price of the raw material $Mg_2Si$ is about 11,000 yuan/ton, while in the closest prior art the price of the raw material $MgH_2$ is about 800,000 yuan/ton. With this method, even if only raw materials are considered, the costs have been reduced significantly. Based on the available literature (Journal of Power Sources, 2014, 269, 768-772), the prior art requires dehydration, while this method does not require dehydration, thereby enabling this method to save 3.4% of the energy.

Example 19

In a glove box with an argon atmosphere of 0.1 MPa, magnesium hydride, magnesium and sodium metaborate dihydrate were weighed at a molar ratio of 2:2:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (c) in FIG. 2, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 60% by iodine titration. The price of the raw material Mg is about 12,000 yuan/ton, while in the closest prior art the price of the raw material $MgH_2$ is about 800,000 yuan/ton. With this method, even if only raw materials are considered, the costs have been reduced significantly. Based on the available literature (Journal of Power Sources, 2014, 269, 768-772), the prior art requires dehydration, while this method does not require dehydration, thereby enabling this method to save 3.4% of the energy.

Example 20

In a glove box with an argon atmosphere of 0.1 MPa, magnesium hydride, magnesium and sodium metaborate dihydrate were weighed at a molar ratio of 1:3:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (c) in FIG. 2, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 55% by iodine titration.

Example 21

In a glove box with an argon atmosphere of 0.1 MPa, magnesium hydride, magnesium and sodium metaborate dihydrate were weighed at a molar ratio of 3:1:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (c) in FIG. 2, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 66% by iodine titration.

Example 22

Figure 6:
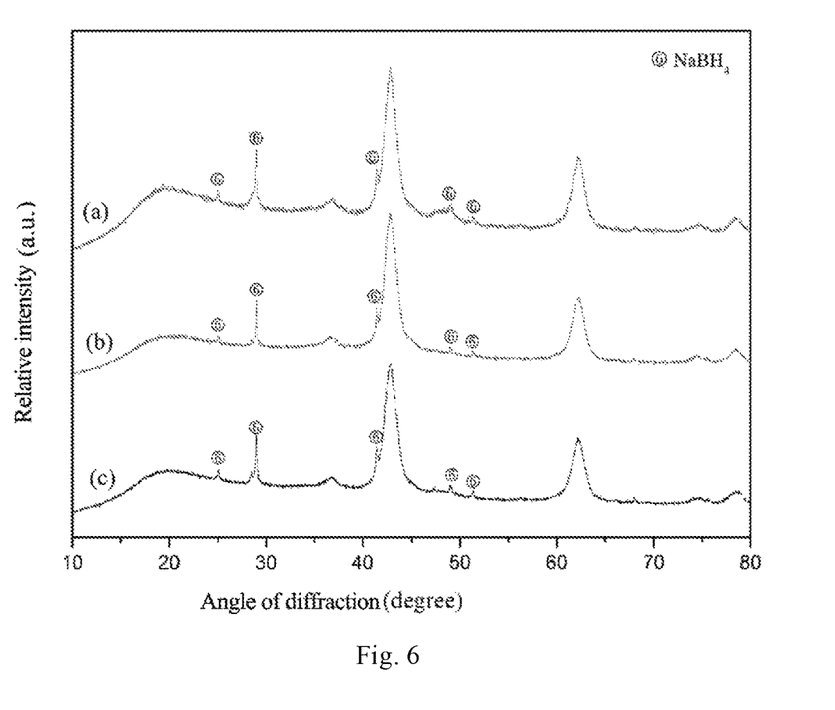
FIG. 6 shows an XRD pattern of a milled product of magnesium hydride, magnesium silicide and sodium metaborate dihydrate according to examples of the present invention; and the examples corresponding to the respective lines in the figure are as follows: (a) Example 22; (b) Example 23; and (c) Example 24.

In a glove box with an argon atmosphere of 0.1 MPa, magnesium hydride, magnesium silicide and sodium metaborate dihydrate were weighed at a molar ratio of 1:1.5:1, mixed, and placed in a ball mill tank, which was then placed in a high-energy oscillating ball mill (QM-3C); and then the materials were directly milled in the argon atmosphere for 5 h at a ratio of grinding media to material of 50:1 and a rotational speed of 1200 rpm. The curve (a) in FIG. 6 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 56% by iodine titration. The price of the raw material $Mg_2Si$ is about 11,000 yuan/ton, while in the closest prior art the price of the raw material $MgH_2$ is about 800,000 yuan/ton. With this method, even if only raw materials are considered, the costs have been reduced significantly. Based on the available literature (Journal of Power Sources, 2014, 269, 768-772), the prior art requires dehydration, while this method does not require dehydration, thereby enabling this method to save 3.4% of the energy.

Example 23

In a glove box with an argon atmosphere of 0.1 MPa, magnesium hydride, magnesium silicide and sodium metaborate dihydrate were weighed at a molar ratio of 2:1:1, mixed, and placed in a ball mill tank, which was then placed in a high-energy oscillating ball mill (QM-3C); and then the materials were directly milled in the argon atmosphere for 5 h at a ratio of grinding media to material of 50:1 and a rotational speed of 1200 rpm. The curve (c) in FIG. 6 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 59% by iodine titration.

Example 24

In a glove box with an argon atmosphere of 0.1 MPa, magnesium hydride, magnesium silicide and sodium metaborate dihydrate were weighed at a molar ratio of 3:0.5:1, mixed, and placed in a ball mill tank, which was then placed in a high-energy oscillating ball mill (QM-3C); and then the materials were directly milled in the argon atmosphere for 5 h at a ratio of grinding media to material of 50:1 and a rotational speed of 1200 rpm. The curve (b) in FIG. 6 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 60% by iodine titration.

Example 25

In a glove box with an argon atmosphere of 0.1 MPa, magnesium, magnesium silicide and sodium metaborate dihydrate were weighed at a molar ratio of (4/3):(4/3):1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (a) in FIG. 4, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 52% by iodine titration.

Example 26

In a glove box with an argon atmosphere of 0.1 MPa, magnesium, magnesium silicide and sodium metaborate dihydrate were weighed at a molar ratio of 2:1:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (a) in FIG. 4, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 46% by iodine titration.

Example 27

In a glove box with an argon atmosphere of 0.1 MPa, magnesium, magnesium silicide and sodium metaborate dihydrate were weighed at a molar ratio of 1:1.5:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (a) in FIG. 4, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 55% by iodine titration.

Example 28

In a glove box with an argon atmosphere of 0.1 MPa, magnesium hydride, magnesium and sodium metaborate tetrahydrate were weighed at a molar ratio of 3:3:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (e) in FIG. 1, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 50% by iodine titration.

Example 29

In a glove box with an argon atmosphere of 0.1 MPa, magnesium hydride, magnesium and sodium metaborate tetrahydrate were weighed at a molar ratio of 4:2:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (e) in FIG. 1, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 57% by iodine titration.

Example 30

In a glove box with an argon atmosphere of 0.1 MPa, magnesium hydride, magnesium and sodium metaborate tetrahydrate were weighed at a molar ratio of 2:4:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (e) in FIG. 1, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 46% by iodine titration.

Example 31

Figure 7:
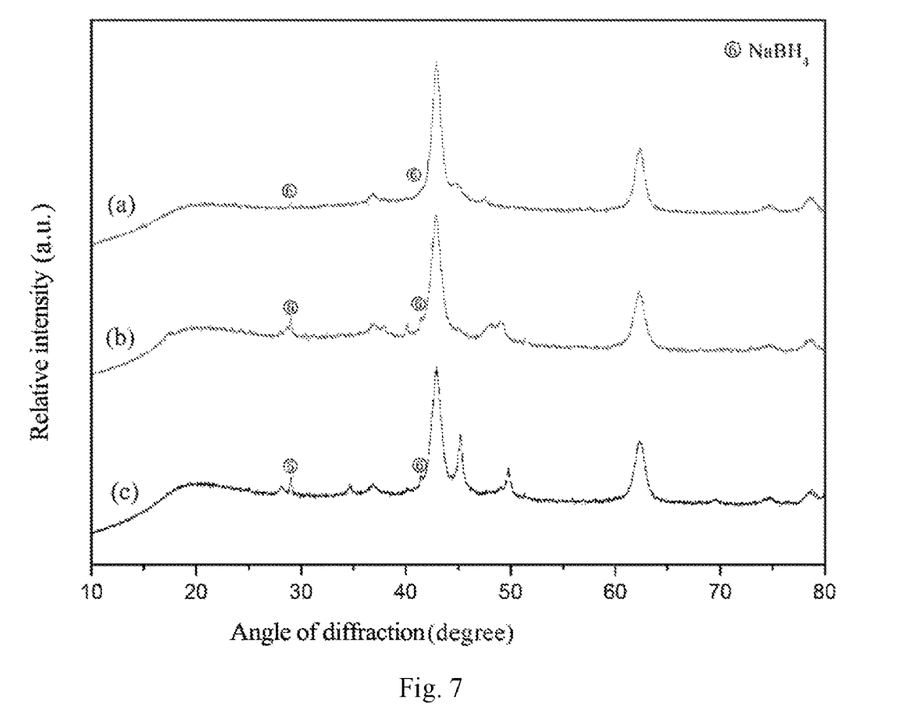
FIG. 7 shows an XRD pattern of a milled product of magnesium hydride, magnesium silicide and sodium metaborate tetrahydrate according to examples of the present invention; and the examples corresponding to the respective lines in the figure are as follows: (a) Example 31; (b) Example 32; and (c) Example 33.

In a glove box with an argon atmosphere of 0.1 MPa, magnesium hydride, magnesium silicide and sodium metaborate tetrahydrate were weighed at a molar ratio of 1:2.5:1, mixed, and placed in a ball mill tank, which was then placed in a high-energy oscillating ball mill (QM-3C); and then the materials were directly milled in the argon atmosphere for 5 h at a ratio of grinding media to material of 50:1 and a rotational speed of 1200 rpm. The curve (b) in FIG. 7 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 61% by iodine titration.

Example 32

In a glove box with an argon atmosphere of 0.1 MPa, magnesium hydride, magnesium silicide and sodium metaborate tetrahydrate were weighed at a molar ratio of 3:1.5:1, mixed, and placed in a ball mill tank, which was then placed in a high-energy oscillating ball mill (QM-3C); and then the materials were directly milled in the argon atmosphere for 5 h at a ratio of grinding media to material of 50:1 and a rotational speed of 1200 rpm. The curve (c) in FIG. 7 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 69% by iodine titration.

Example 33

In a glove box with an argon atmosphere of 0.1 MPa, magnesium hydride, magnesium silicide and sodium metaborate tetrahydrate were weighed at a molar ratio of 5:0.5:1, mixed, and placed in a ball mill tank, which was then placed in a high-energy oscillating ball mill (QM-3C); and then the materials were directly milled in the argon atmosphere for 5 h at a ratio of grinding media to material of 50:1 and a rotational speed of 1200 rpm. The curve (a) in FIG. 7 is an XRD pattern of the milled product. The diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 72% by iodine titration.

Example 34

In a glove box with an argon atmosphere of 0.1 MPa, magnesium, magnesium silicide and sodium metaborate tetrahydrate were weighed at a molar ratio of 2:2:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (a) in FIG. 4, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 57% by iodine titration.

Example 35

In a glove box with an argon atmosphere of 0.1 MPa, magnesium, magnesium silicide and sodium metaborate tetrahydrate were weighed at a molar ratio of 3:1.5:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (a) in FIG. 4, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 52% by iodine titration.

Example 36

In a glove box with an argon atmosphere of 0.1 MPa, magnesium, magnesium silicide and sodium metaborate tetrahydrate were weighed at a molar ratio of 1:2.5:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. With the XRD pattern similar to the curve (a) in FIG. 4, the diffraction peaks appearing at 25.1°, 28.9° and 41.4° in the curve belong to sodium borohydride crystals, proving that sodium borohydride crystals were formed. The mixture was dissolved in ethylene diamine, and then filtered to obtain a clear filtrate, which was dried in vacuum to produce white powder, with the yield quantitatively determined to be 58% by iodine titration.

Example 37

Figure 9:
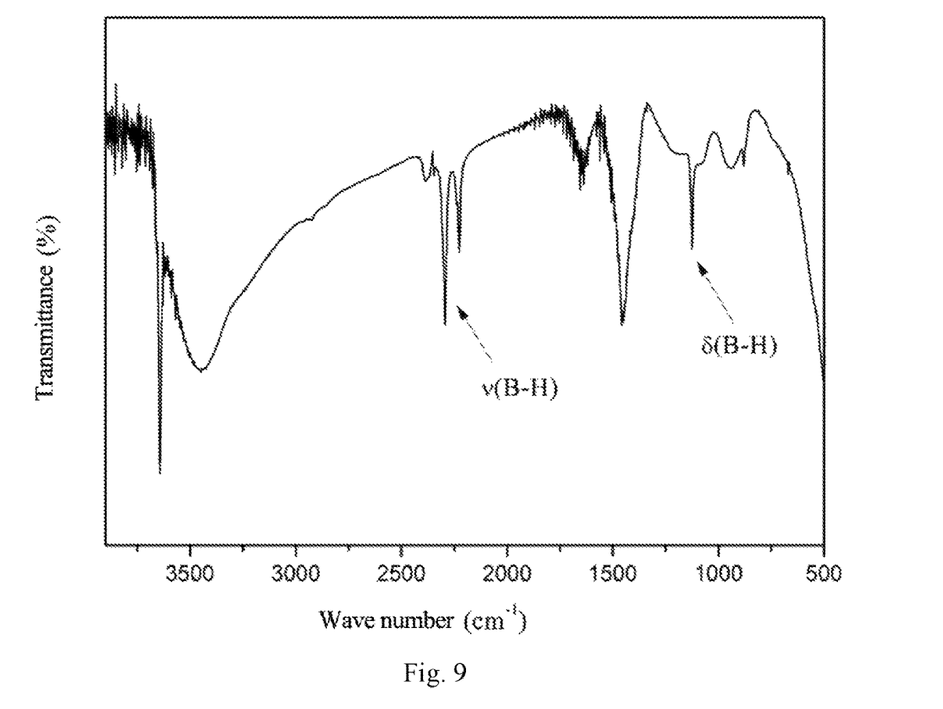
FIG. 9 shows an infrared spectrum of a milled product of calcium and sodium metaborate dihydrate according to Example 37 of the present invention.

In a glove box with an argon atmosphere of 0.1 MPa, calcium and sodium metaborate dihydrate were weighed at a molar ratio of 4:1, mixed, and placed in a ball mill tank, which was vacuumed and then charged with a mixed atmosphere (composed of argon and hydrogen) of 2 MPa and then placed in a high-energy oscillating ball mill (QM-3C); and then the materials were directly milled in the argon atmosphere for 10 h at a ratio of grinding media to material of 50:1 and a rotational speed of 1200 rpm. The curve in FIG. 9 is an infrared spectrum of the milled product. The absorption peaks appearing at 2200-2400 $cm^{-1}$ and 1125 $cm^{-1}$ in the figure and corresponding to the B-H vibration demonstrated the formation of the sodium borohydride crystal. The mixture was dissolved in ethylene diamine, and then filtered to obtain a clear filtrate, which was dried in vacuum to produce white powder, with the yield quantitatively determined to be 24% by iodine titration.

Example 38

In a glove box with an argon atmosphere of 0.1 MPa, calcium magnesium alloy and sodium metaborate dihydrate were weighed at a molar ratio of 0.5:1, mixed, and placed in a ball mill tank, which was then placed in a high-energy oscillating ball mill (QM-3C); and then the materials were directly milled in the argon atmosphere for 1 h at a ratio of grinding media to material of 5:1 and a rotational speed of 1200 rpm. With the infrared spectrum similar to the curve in FIG. 9, the absorption peaks appearing at 2200-2400 $cm^{-1}$ and 1125 $cm^{-1}$ in the figure and corresponding to the B-H vibration demonstrated the formation of the sodium borohydride crystal. The mixture was dissolved in ethylene diamine, and then filtered to obtain a clear filtrate, which was dried in vacuum to produce white powder, with the yield quantitatively determined to be 7% by iodine titration.

Example 39

Figure 10:
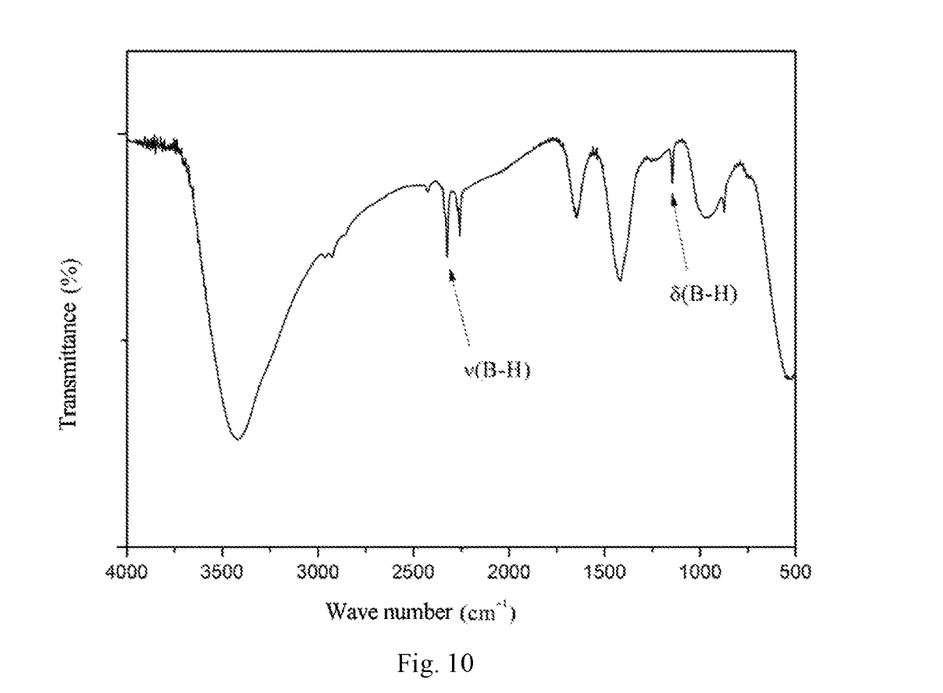
FIG. 10 shows an infrared spectrum of a milled product of aluminum and sodium metaborate dihydrate according to Example 39 of the present invention.

In a glove box with an argon atmosphere of 0.1 MPa, aluminum and sodium metaborate dihydrate were weighed at a molar ratio of 2:1, mixed, and placed in a ball mill tank, which was then placed in a high-energy oscillating ball mill (QM-3C); and then the materials were directly milled in the argon atmosphere for 10 h at a ratio of grinding media to material of 50:1 and a rotational speed of 1200 rpm. The curve in FIG. 10 is an infrared spectrum of the milled product. The absorption peaks appearing at 2200-2400 cm$^{-1}$ and 1125 cm$^{-1}$ in the figure and corresponding to the B-H vibration demonstrated the formation of the sodium borohydride crystal. The mixture was dissolved in ethylene diamine, and then filtered to obtain a clear filtrate, which was dried in vacuum to produce white powder, with the yield quantitatively determined to be 13% by iodine titration.

Example 40

In a glove box with an argon atmosphere of 0.1 MPa, aluminum, magnesium and sodium metaborate dihydrate were weighed at a molar ratio of 2:2:1, mixed, and placed in a ball mill tank, which was then placed in a high-energy oscillating ball mill (QM-3C); and then the materials were directly milled in the argon atmosphere for 2 h at a ratio of grinding media to material of 50:1 and a rotational speed of 1200 rpm. The mixture was dissolved in ethylene diamine, and then filtered to obtain a clear filtrate, which was dried in vacuum to produce white powder, with the yield quantitatively determined to be 11% by iodine titration.

Example 41

In a glove box with an argon atmosphere of 0.1 MPa, aluminum, magnesium hydride and sodium metaborate dihydrate were weighed at a molar ratio of 2:2:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 42% by iodine titration.

Example 42

In a glove box with an argon atmosphere of 0.1 MPa, aluminum, magnesium silicide and sodium metaborate dihydrate were weighed at a molar ratio of 2:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 35% by iodine titration.

Example 43

In a glove box with an argon atmosphere of 0.1 MPa, aluminum, calcium magnesium alloy and sodium metaborate dihydrate were weighed at a molar ratio of 4:1:2, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 29% by iodine titration.

Example 44

In a glove box with an argon atmosphere of 0.1 MPa, calcium magnesium alloy, magnesium and sodium metaborate dihydrate were weighed at a molar ratio of 1:4:2, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 44% by iodine titration.

Example 45

In a glove box with an argon atmosphere of 0.1 MPa, calcium magnesium alloy, magnesium hydride and sodium metaborate dihydrate were weighed at a molar ratio of 1:4:2, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 61% by iodine titration.

Example 46

In a glove box with an argon atmosphere of 0.1 MPa, calcium magnesium alloy, magnesium silicide and sodium metaborate dihydrate were weighed at a molar ratio of 1:2:2, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 46% by iodine titration.

Example 47

In a glove box with an argon atmosphere of 0.1 MPa, magnesium, anhydrous sodium metaborate and sodium metaborate tetrahydrate were weighed at a molar ratio of 8:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 40% by iodine titration.

Example 48

In a glove box with an argon atmosphere of 0.1 MPa, magnesium hydride, anhydrous sodium metaborate and sodium metaborate tetrahydrate were weighed at a molar ratio of 8:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 82% by iodine titration.

Example 49

In a glove box with an argon atmosphere of 0.1 MPa, magnesium silicide, anhydrous sodium metaborate and sodium metaborate tetrahydrate were weighed at a molar ratio of 4:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 64% by iodine titration.

Example 50

In a glove box with an argon atmosphere of 0.1 MPa, calcium magnesium alloy, anhydrous sodium metaborate and sodium metaborate tetrahydrate were weighed at a molar ratio of 1:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 38% by iodine titration.

Example 51

In a glove box with an argon atmosphere of 0.1 MPa, aluminum, anhydrous sodium metaborate and sodium metaborate tetrahydrate were weighed at a molar ratio of 6:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 10% by iodine titration.

Example 52

In a glove box with an argon atmosphere of 0.1 MPa, aluminum, magnesium, anhydrous sodium metaborate and sodium metaborate tetrahydrate were weighed at a molar ratio of 4:4:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 27% by iodine titration.

Example 53

In a glove box with an argon atmosphere of 0.1 MPa, aluminum, magnesium hydride, anhydrous sodium metaborate and sodium metaborate tetrahydrate were weighed at a molar ratio of 4:4:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 43% by iodine titration.

Example 54

In a glove box with an argon atmosphere of 0.1 MPa, aluminum, magnesium silicide, anhydrous sodium metaborate and sodium metaborate tetrahydrate were weighed at a molar ratio of 4:2:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 31% by iodine titration.

Example 55

In a glove box with an argon atmosphere of 0.1 MPa, aluminum, calcium magnesium alloy, anhydrous sodium metaborate and sodium metaborate tetrahydrate were weighed at a molar ratio of 4:1:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 21% by iodine titration.

Example 56

In a glove box with an argon atmosphere of 0.1 MPa, calcium magnesium alloy, magnesium, anhydrous sodium metaborate and sodium metaborate tetrahydrate were weighed at a molar ratio of 1:4:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 48% by iodine titration.

Example 57

In a glove box with an argon atmosphere of 0.1 MPa, calcium magnesium alloy, magnesium hydride, anhydrous sodium metaborate and sodium metaborate tetrahydrate were weighed at a molar ratio of 1:4:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 63% by iodine titration.

Example 58

In a glove box with an argon atmosphere of 0.1 MPa, calcium magnesium alloy, magnesium silicide, anhydrous sodium metaborate and sodium metaborate tetrahydrate were weighed at a molar ratio of 1:2:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 49% by iodine titration.

Example 59

In a glove box with an argon atmosphere of 0.1 MPa, magnesium hydride, magnesium, magnesium silicide and sodium metaborate dihydrate were weighed at a molar ratio of 1:1:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 57% by iodine titration.

Example 60

In a glove box with an argon atmosphere of 0.1 MPa, magnesium hydride, magnesium, aluminum and sodium metaborate dihydrate were weighed at a molar ratio of 3:3:2:2, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 44% by iodine titration.

Example 61

In a glove box with an argon atmosphere of 0.1 MPa, magnesium hydride, magnesium silicide, aluminum and sodium metaborate dihydrate were weighed at a molar ratio of 1:1:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 47% by iodine titration.

Example 62

In a glove box with an argon atmosphere of 0.1 MPa, magnesium, magnesium silicide, aluminum and sodium metaborate dihydrate were weighed at a molar ratio of 1:1:1:1, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 41% by iodine titration.

Example 63

In a glove box with an argon atmosphere of 0.1 MPa, magnesium hydride, calcium magnesium alloy, magnesium silicide and sodium metaborate dihydrate were weighed at a molar ratio of 4:1:2:3, mixed, and placed in a ball mill tank, which was then placed in a high-energy oscillating ball mill (QM-3C); and then the materials were directly milled in the argon atmosphere for 1 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 8% by iodine titration.

Example 64

In a glove box with an argon atmosphere of 0.1 MPa, magnesium hydride, calcium magnesium alloy, aluminum and sodium metaborate dihydrate were weighed at a molar ratio of 4:1:2:3, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 50% by iodine titration.

Example 65

In a glove box with an argon atmosphere of 0.1 MPa, aluminum, calcium magnesium alloy, magnesium silicide and sodium metaborate dihydrate were weighed at a molar ratio of 2:1:2:3, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 35% by iodine titration.

Example 66

In a glove box with an argon atmosphere of 2 MPa, magnesium hydride, magnesium silicide, aluminum, magnesium and sodium metaborate dihydrate were weighed at a molar ratio of 2:1:1:2:2, mixed, and placed in a ball mill tank, which was then placed in a high-energy oscillating ball mill (QM-3C); and then the materials were directly milled in the argon atmosphere for 10 h at a ratio of grinding media to material of 5:1 and a rotational speed of 1000 rpm. The mixture was dissolved in ethylene diamine, and then filtered to obtain a clear filtrate, which was dried in vacuum to produce white powder, with the yield quantitatively determined to be 13% by iodine titration.

Example 67

In a glove box with an argon atmosphere of 0.1 MPa, magnesium hydride, magnesium silicide, aluminum, calcium magnesium alloy and sodium metaborate dihydrate were weighed at a molar ratio of 4:2:2:1:4, mixed, and placed in a ball mill tank, which was then placed in a high-energy oscillating ball mill (QM-3C); and then the materials were directly milled in the argon atmosphere for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 51% by iodine titration.

Example 68

In a glove box with an argon atmosphere of 0.1 MPa, magnesium hydride, magnesium silicide, aluminum, calcium magnesium alloy and sodium metaborate dihydrate were weighed at a molar ratio of 4:2:2:1:4, mixed, and placed in a ball mill tank, which was vacuumed and then placed in a high-energy oscillating ball mill (QM-3C); and then the materials were milled for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 39% by iodine titration.

Example 69

In a glove box with an argon atmosphere of 0.1 MPa, magnesium hydride, magnesium silicide, aluminum, calcium magnesium alloy and sodium metaborate dihydrate were weighed at a molar ratio of 4:2:2:1:4, mixed, and placed in a ball mill tank, which was then placed in a high-energy oscillating ball mill (QM-3C); and then the materials were milled for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 52% by iodine titration.

Example 70

In a glove box with an argon atmosphere of 0.1 MPa, magnesium hydride and sodium metaborate dihydrate were weighed at a molar ratio of 8:1, mixed, and placed in a ball mill tank, which was then placed in a high-energy oscillating ball mill (QM-3C); and then the materials were milled for 10 h at a ratio of grinding media to material of 30:1 and a rotational speed of 1200 rpm. The mixture was dissolved in ethylene diamine, and then filtered to obtain a clear filtrate, which was dried in vacuum to produce white powder, with the yield quantitatively determined to be 88% by iodine titration.

Example 71

In a glove box with an argon atmosphere of 0.1 MPa, magnesium silicide and sodium metaborate dihydrate were weighed at a molar ratio of 8:1, mixed, and placed in a ball mill tank, which was then placed in a high-energy oscillating ball mill (QM-3C); and then the materials were milled for 10 h at a ratio of grinding media to material of 50:1 and a rotational speed of 1200 rpm. The mixture was dissolved in ethylene diamine, and then filtered to obtain a clear filtrate, which was dried in vacuum to produce white powder, with the yield quantitatively determined to be 80% by iodine titration.

The above examples are preferred embodiments of the present invention, but the embodiments of the present invention is not limited thereto, and any other alterations, modifications, substitutions, combinations and simplifications made without departing from the spirit and principle of the present invention should all be equivalent replacements and included in the protection scope of the present invention.

The invention claimed is:

1. A method for directly synthesizing sodium borohydride by solid-state ball milling at room temperature, characterized in that: performing solid-state ball milling on a mixture of a reducing agent and a reduced material by using a ball mill under room temperature, and performing purification to obtain sodium borohydride;

the reducing agent comprises one or more of magnesium, magnesium hydride, aluminum, calcium, and magnesium silicide;

the reduced material is sodium metaborate containing crystallization water, or is a mixture of sodium metaborate containing crystallization water and anhydrous sodium metaborate; and the solid-state ball milling is carried out in a non-oxidizing atmosphere.

2. The method for directly synthesizing sodium borohydride by solid-state ball milling at room temperature according to claim 1, characterized in that: the molar ratio of the reducing agent to the reduced material is determined as follows:

let the molar amount of magnesium in the reducing agent be $n_1$ ($n_1 \geq 0$), the molar amount of aluminum element be $n_2$ ($n_2 \geq 0$), and the molar amount of calcium element be $n_3$ ($n_3 \geq 0$), and let the number of oxygen in the reduced material be a, then $(n_1+1.5n_2+n_3):a=(3:4)$ to $(4:1)$.

3. The method for directly synthesizing sodium borohydride by solid-state ball milling at room temperature according to claim 1, characterized in that: the non-oxidizing atmosphere is a mixed atmosphere of argon and hydrogen, or an argon atmosphere, or a hydrogen atmosphere, or vacuum.

4. The method for directly synthesizing sodium borohydride by solid-state ball milling at room temperature according to claim 3, characterized in that: the pressure of the mixed atmosphere of argon and hydrogen is 0-2 MPa, the pressure of the argon atmosphere is 0-2 MPa, and the pressure of the hydrogen atmosphere is 0-2 Mpa.

5. The method for directly synthesizing sodium borohydride by solid-state ball milling at room temperature according to claim 1, characterized in that: the ball mill is a high-energy oscillating ball mill.

6. The method for directly synthesizing sodium borohydride by solid-state ball milling at room temperature according to claim 5, characterized in that: the ball mill has a ratio of grinding media to material of (5-50):1, a ball milling time of 1-20 h, and a rotational speed of 1000-1200 rpm.

7. The method for directly synthesizing sodium borohydride by solid-state ball milling at room temperature according to claim 1, characterized in that: the purification is specifically as follows:

the milled mixture is dissolved in a solvent, and then filtered to obtain a clear filtrate, which is dried to produce purified sodium borohydride powder.

8. The method for directly synthesizing sodium borohydride by solid-state ball milling at room temperature according to claim 7, characterized in that: the solvent is ethylene diamine.

9. The method for directly synthesizing sodium borohydride by solid-state ball milling at room temperature according to claim 7, characterized in that: the drying is vacuum drying.

10. The method for directly synthesizing sodium borohydride by solid-state ball milling at room temperature according to claim 1, characterized in that: the sodium metaborate containing crystallization water is sodium metaborate dihydrate or sodium metaborate tetrahydrate.

\* \* \* \* \*